United States Patent Office 3,560,376
Patented Feb. 2, 1971

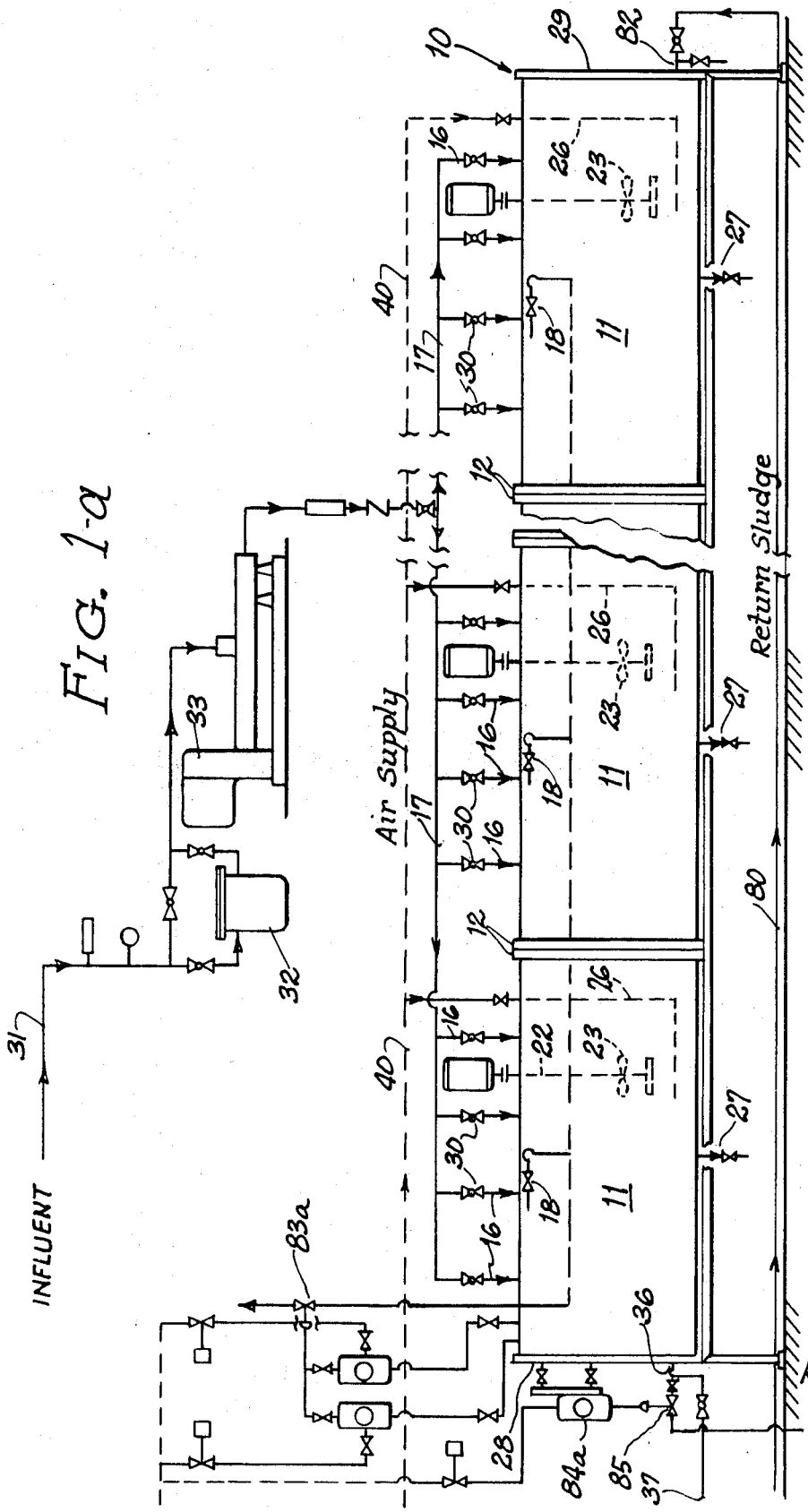

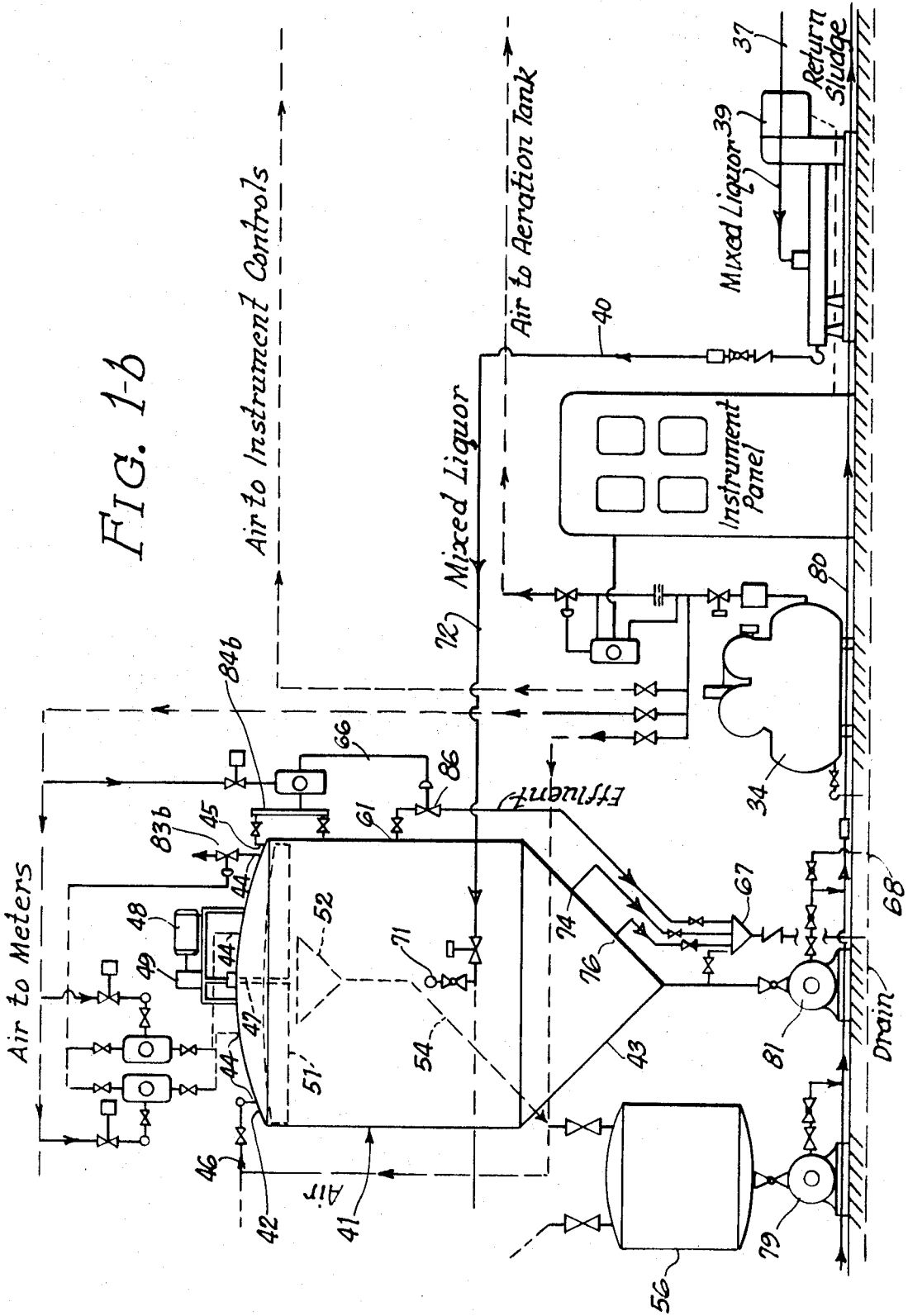

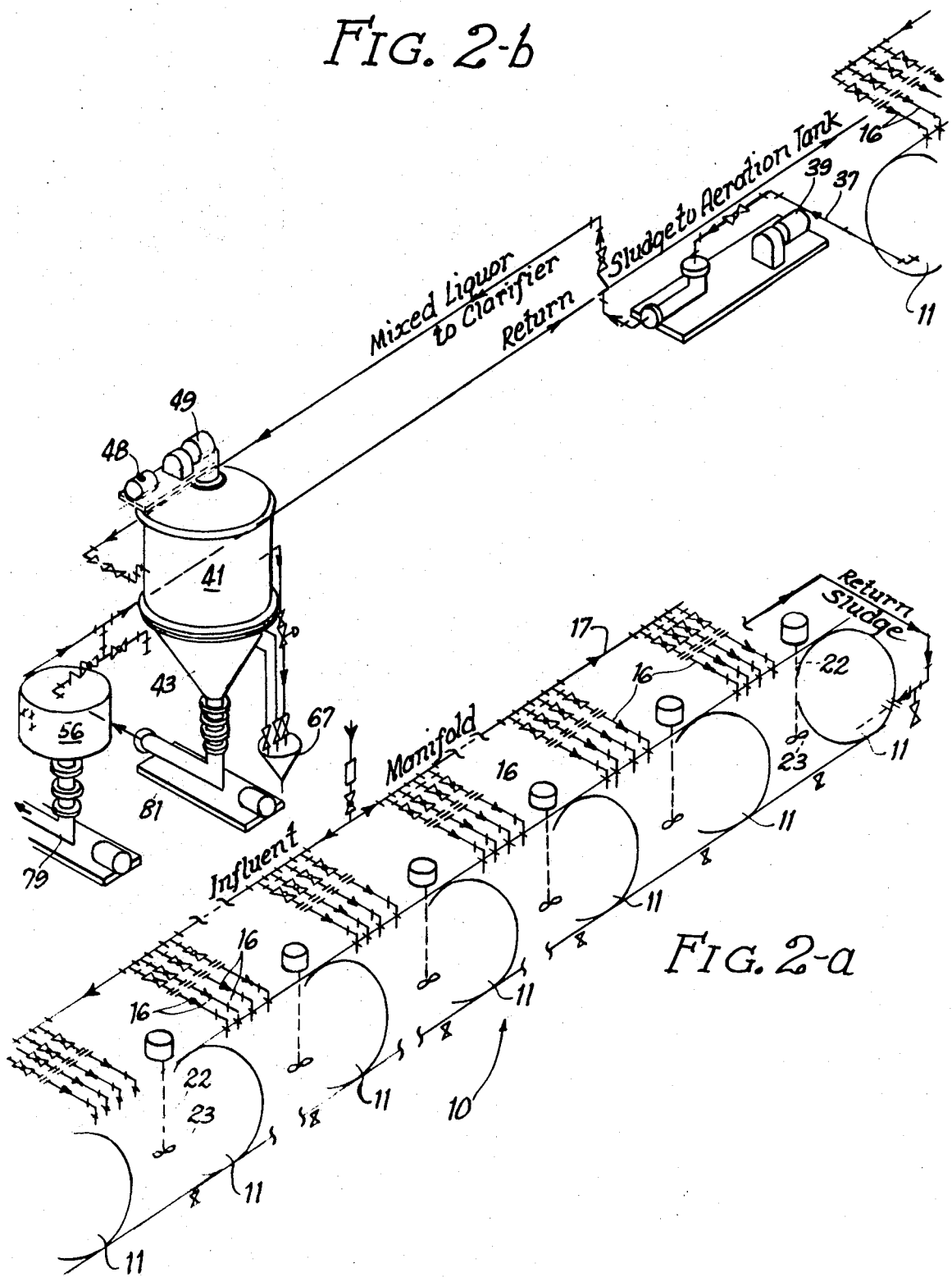

3,560,376
METHOD AND APPARATUS FOR USE IN THE ACTIVATED SLUDGE TREATMENT OF SEWAGE
Richard W. Heil, Clarendon Hills, Ill., assignor to Metropolitan Sanitary District of Greater Chicago, Chicago, Ill., a corporation of Illinois
Filed Oct. 30, 1968, Ser. No. 783,157
Int. Cl. C02c 1/12
U.S. Cl. 210—7                           14 Claims

ABSTRACT OF THE DISCLOSURE

An apparatus and method used in the activated sludge treatment of secondary sewage utilizes a pressure aeration tank for treating a continuous flow of sewage influent. The tank is maintained at pressures up to 60 p.s.i. and the mixed liquor in the tank is continuously aerated. Influent is introduced in the aeration tank through a distribution manifold at spaced points longitudinally of the tank.

Upon entering the aeration tank, the influent is intermixed with return activated sludge (made up of living micro-organisms) forming a mixed liquor. Within the mixed liquor, micro-organisms feed upon the sewage nutrients, consuming them by adsorption and absorption. The flow of influent through each branch of the manifold is separately controlled so as to maintain the nutrient feed level of the mixed liquor uniform throughout the tank. The mixed liquor passes from the aeration tank to a clarifier which is also maintained at the same pressure as the treatment tank.

---

The activated sludge tends to flocculate in the clarifier and separate from the treated liquor leaving a clear effluent. The sludge is pumped back into the aeration tank for seeding purposes while the effluent is drawn off through a peripheral draw-off-ring in the clarifier and discharged into a drain.

This invention relates to an apparatus and method used in the activated sludge treatment of sewage.

In conventional systems of activated sludge treatment of sewage, raw sewage is first screened and settled to remove the heavier and more solid materials and the liquid component or primary effluent then flows into an open aerating tank. Both the seeding bacteria (return sludge) and the total flow of nutrients (liquid component) are introduced at a common point of entry and flow together through the tank in which the aerobic bacteria are propogated. As a result, the bacteria are initially subjected to an overabundance of nutrients and, as the liquid component approaches the discharge end of the aeration tank, there is a progressive decline in the nutrient level, amounting substantially to semi-starvation conditions. The constant need of the biological population to acclimate to radical changes in the nutrient-to-bacteria ratio materially reduces biological efficiency.

In accordance with my invention, I provided a method and apparatus for the activated sludge treatment of sewage, utilizing a pressurized aeration tank operable at pressure conditions up to 60 p.s.i.g. (pounds per sq. in. gage) and employing a novel manifold distribution means for the controlled feeding of primary effluent. This provides a very high level of dissolved oxygen in the liquid being treated, thereby producing vigorous biological activity and a constant feed ratio along the entire length of the aeration tank to maintain the nutrient level constant at all times. Additionalliy, I provide a novel pressurized clarifying apparatus to maintain a high level of dissolved oxygen, in order to prevent leakage of phosphates from the bacteria back into solution and spoiling the final effluent. When the clarification unit is operated at the same pressure as the aeration unit, activated sludge flocculates and separates from the treated effluent and settles downwardly. When the clarification unit is operated at a lower pressure than the aeration unit, dissolved gases coming out of solution buoy sludge flocculate to the top of the unit where it is skimmed off. In both cases the flocculate is then pumped to the return sludge line.

Among the objects of my invention are the provision of an apparatus and method for activated sludge treatment of sewage for effecting the following results:

(1) An increase in the BOD (biological oxygen demand) removals, above 95%.
(2) An increase in phosphate removals.
(3) Destruction of anaerobic pathogens and parasites.
(4) A reduction in the retention time for treatment, and
(5) An increase in oxygen transfer efficiency.

Other further objects and advantages of my invention will more fully appear in the following description and the accompanying drawings in illustration thereof.

In the drawings:

FIGS. 1–a and 1–b are collectively a flow diagram of the present invention.

FIGS. 2–a and 2–b are more or less perspective diagrammatic views illustrating the piping system of the flow diagram shown in FIGS. 1–a and 1–b.

Figure 3:
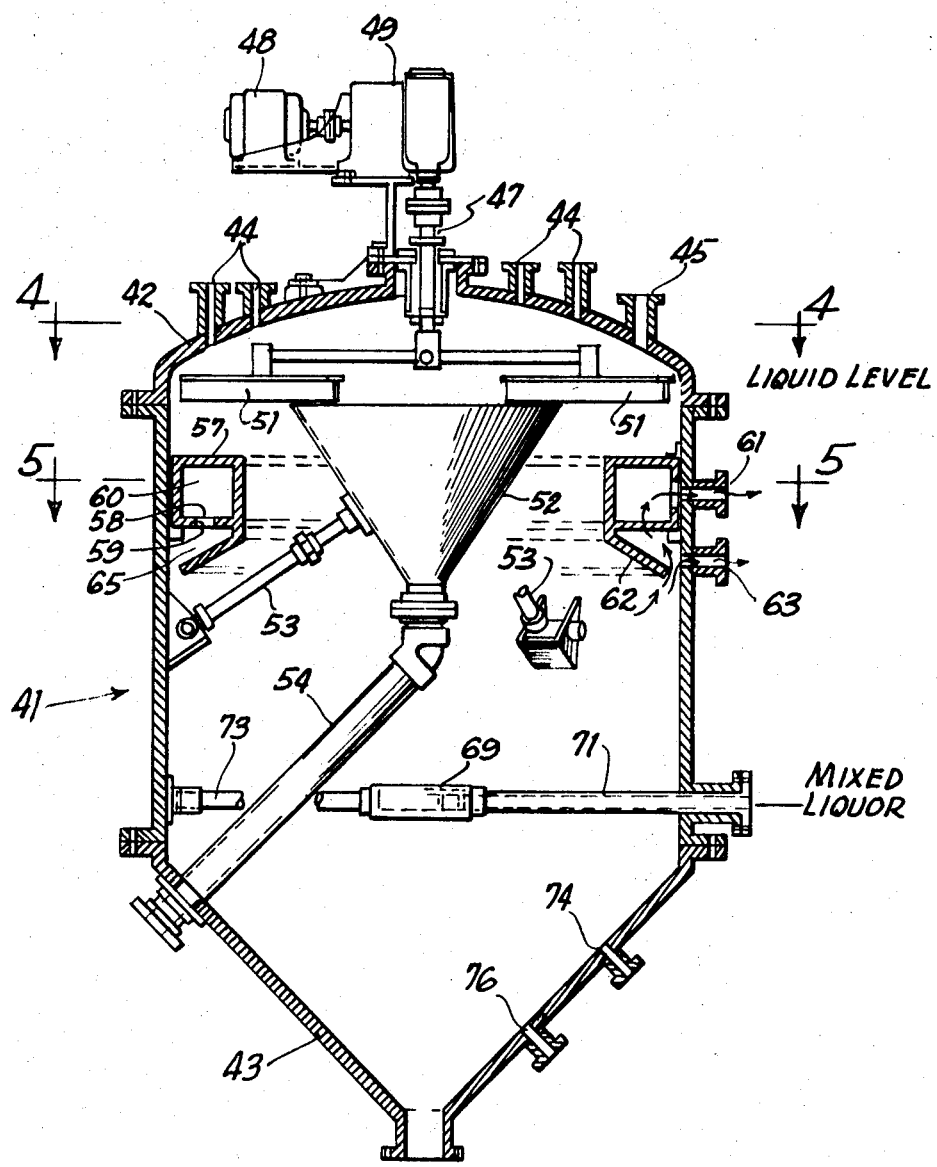
FIG. 3 is a vertical cross-sectional view, on an enlarged scale, of a clarifier unit, in accordance with my invention.

It will be noted that drawings illustrate various types of components, such as valves, gages, meters and recorders which, in the following specification, are not described or identified by reference numerals. Such types of components are conventional and their uses and functions are well known in the art.

Figure 6:
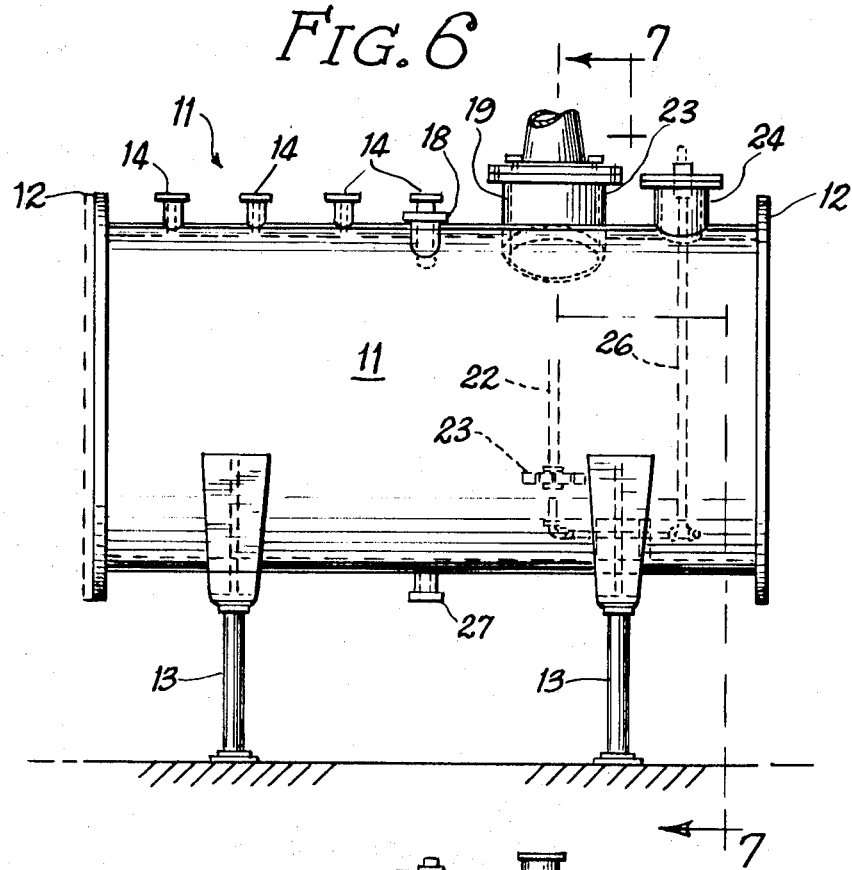
FIG. 6 is an elevational view of an aeration tank module.
Figure 7:
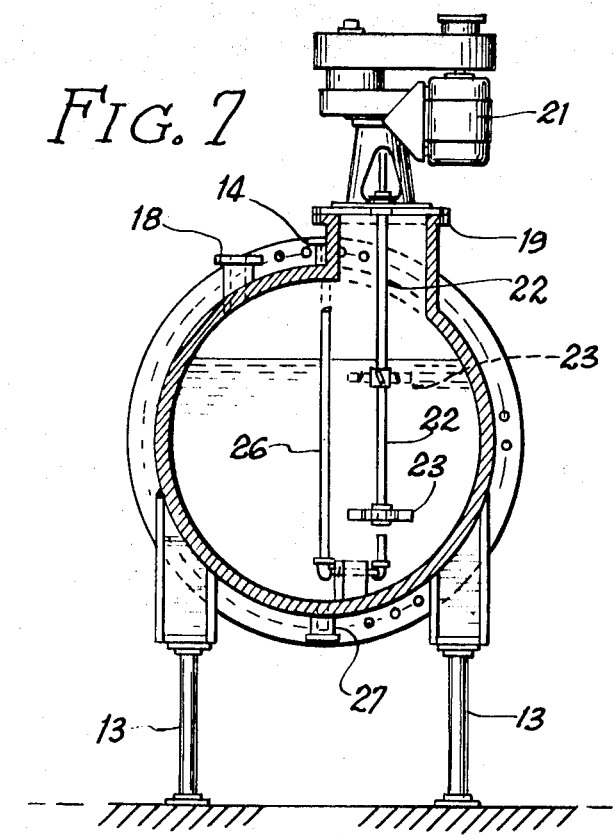
FIG. 7 is a cross-sectional view taken substantially on line 7—7 of FIG. 6.

Referring to FIG. 1–a the numeral 10 indicates, generally, an aeration tank comprised of a series of tank modules 11 connected end to end to make a desired length, approximately within a range of 200–1500 ft. Each module 11 (FIGS. 6 and 7) comprises a cylindrical body having a diameter of approximately 10 ft. and being suitably supported, as on standards 13. It will be understood, however, that the module 11 may comprise any other form and may be supported, in or as on the ground, or on any other suitable support means. Each module 11 is provided with a plurality of ports 14, at the top thereof, said ports being longitudinally spaced and each being connected to a branch feed line 16 or a header 17. Together, the feed lines and header constitute a distribution manifold.

The tank module 11 also is provided with another port 18 to which is connected a bleeder valve 83a. The module 11 is provided with a flanged manhole 19 on which is supported the lower end of a motor assembly 21 having a vertical depending agitator shaft 22 on which is carried a pair of agitator blades 23 arranged in axially spaced relation. A second flanged manhole 24 of smaller size is provided on which is supported an air sparge assembly 26, the operating portion of which is disposed substantially near the bottom of the tank module and below the agitator shaft 22. The air sparge 26 is connected to an air supply line, hereinafter to be described. It will be understood that other conventional means, such as a jet ejector sparge may be used for aerating. Each module 11 is provided with a drain port 27 in the bottom thereof. The end modules are provided with bulk heads 28 and 29, respectively, to constitute the aeration tank a closed chamber which is capable of operating under a range of pressure, as will be hereinafter explained.

Referring to FIG. 1–a the numeral 31 indicates a conduit through which effluent from preliminary conventional settling tanks, not shown, is drawn off, such effluent passing through a plug type strainer 32 which removes all particles capable of blocking the feed distribution line 16. The effluent is pumped by a positive displacement pump 33 to the header 17 and to each of the branch feed lines 16, each being provided with a valve 30 to permit regulation of the flow of influent into each module of the aeration tank. Each of the air sparges 26 is connected to a line 40 which is connected to an air compressor 34 which is adapted to provide the required volume and pressure of air for effective operation of the system.

The above described arrangement affords control of the influent feed rate throughout the length of the aeration tank 10 so as to create an environment in which there is maintained a substantially constant ratio between the amount of nutrient biological oxygen demand (BOD) and the number of organisms in the system. Thus, an optimum nutrient feed level is maintained at all times, resulting in high efficiency in the biological treatment of the sewage influent. Pressure within the aeration tank 10 and the clarification units, hereinafter to be described, are regulated by pre-set bleeder valves 83a and b. The system may be operated at any pressure up to a maximum of 60 p.s.i.g. The influent is maintained under constant agitation by the agitator blades 23 so as to obtain a maximum saturation of dissolved oxygen in the liquid undergoing treatment. When aeration is effected under the above described pressure conditions, the saturation point of dissolved oxygen in the liquid undergoing treatment is very substantially increased. For example, at atmospheric pressure, the saturation point for dissolved oxygen in water is about 8 p.p.m. At approximately 60 p.s.i.g., the saturation point is about 40 p.p.m. In the present instance, the increased efficiency of oxygen absorption in my apparatus is achieved through the use of the air sparges 26 and the agitator blades 23, which provide a rotating interface of mixed liquor with the air pocket above the liquid level in the tank 10.

It is known that a minimum concentration of 2 p.p.m. of dissolved oxygen will sustain vigorous biological activity in activated sludge processes. It is believed that concentrations of dissolved oxygen, substantially above this point, will result in increased aerobic activity achieving a higher BOD reduction, than heretofore, in a shorter time interval. Further experiments have indicated that high aeration rates improve phosphate uptake by aerobic bacteria.

In the next stage, the treated liquor discharged from one end of the aeration tank 10, as at 36, flows through conduit 37 to a positive displacement pump 39 which lifts the liquor for passage through conduit 40 into a clarifier 41, presently to be described.

Figure 4:
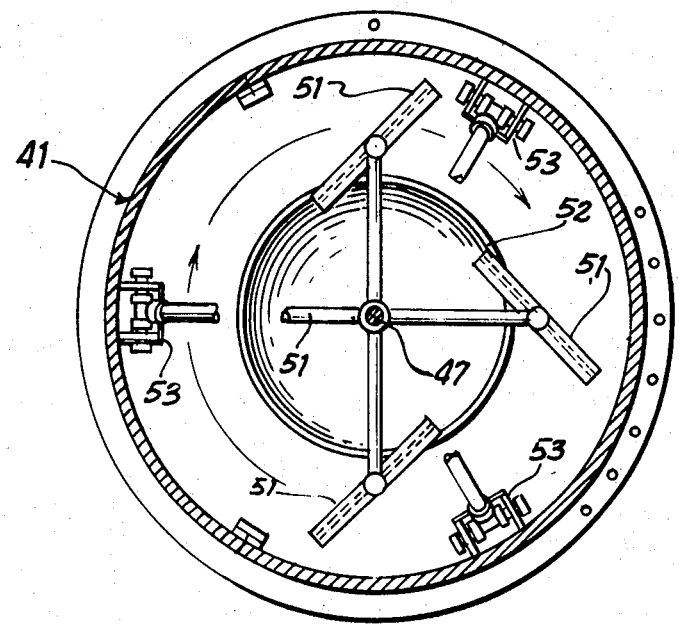
FIG. 4 is a cross-sectional view taken substantially on line 4—4 of FIG. 3.
Figure 5:
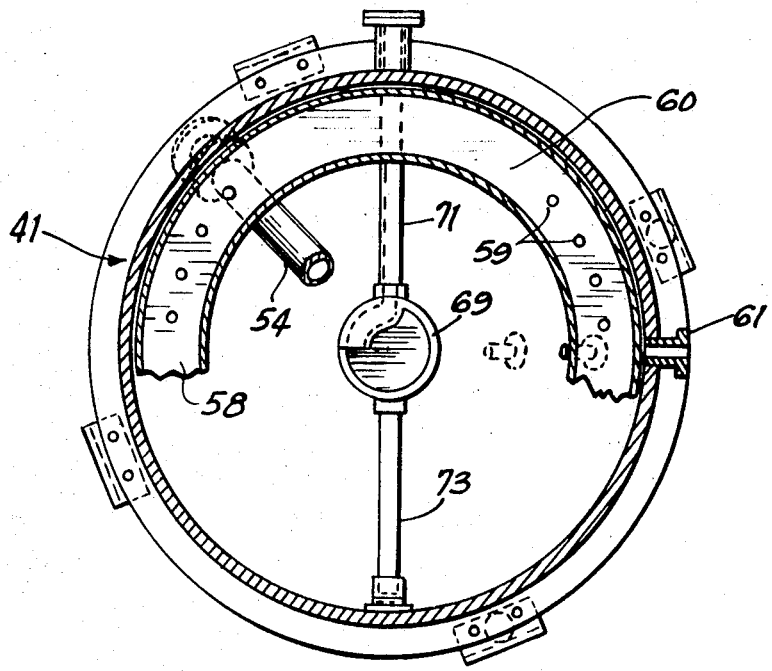
FIG. 5 is a cross-sectional view taken substantially on line 5—5 of FIG. 3.

Referring to FIGS. 3 to 5, the clarifier 41 comprises a generally cylindrical vessel having a domed cover 42 and a generally conical bottom 43. The domed cover 42 is provided with a port 45 for connection to a liquid level controller 84b. It also has four air connection ports 44, one of which is connected to an air line 46 which is connected to the compressor 34 which delivers make-up air under pressure of up to 60 p.s.i.g. to the clarifier 41. Another of the ports 44 is connected to an automatic bleeder valve 83b. The other two ports 44 are connected to controls for the bleeder valve. The domed cover 42 includes a central opening through which projects a shaft 47 driven by an electric motor 48 provided with a speed reducing gear means 49. Attached to the shaft 47 are a plurality of radial skimmer blades 51, the lower edges of which are disposed substantially at the liquid level in the clarifier 41. A conical sludge funnel 52 is arranged centrally of the clarifier, immediately below the rotary blades 51, and is secured in position by three bracket assemblies 53 which are welded to the respective parts. It will be noted that the upper edge of the funnel 52 coincides substantially with the liquid in the clarifier and is located slightly below the lower edges of the blades 51 for purposes of clearance. The lower end of the funnel 52 is open and communicates with a conduit 54 which passes through an opening in the conical bottom 43 of the clarifier and connects to a sludge receiving tank 56.

Disposed within the body of the clarifier 41 below the liquid level, is an effluent draw off ring 60 having an annular chamber, the bottom wall 58 of which is provided with a plurality of apertures 59. The annular chamber 60 communicates with a discharge port 61 in the wall of the clarifier. Depending from the ring 57 is an annular baffle plate 62, generally frusto-conical in form and disposed below the apertures 59 in the ring 51. The lower peripheral edge of the baffle plate 62 is spaced from the inner wall surface of the clarifier 41 and affords an annular passageway to permit the effluent within the clarifier to pass into the chamber 60 and out through the discharge port 61. A second port 63 is provided for connection to the liquid level controller 84b. The direction of flow of effluent from within the clarifier is indicated by the arrows, and it will be seen that the liquid passes into the annular chamber 65, then through the apertures 59 and into the annular chamber 60 and outwardly through the discharge port 61. Discharge of the treated effluent is regulated by an automatic valve 86 which is connected to the liquid level controller 84b.

Referring to FIGS. 3 and 5, a diffuser head 69 is disposed directly over the conical bottom 43 of the clarifier which also constitutes a sludge settlement cone. The diffuser head 69 is connected to a conduit section 71 which passes through the wall of the clarifier 41 and is connected to the pump 39 by a conduit 72. The section 71 affords a means of support for the diffuser 69 and additional support is provided by another section of conduit 73 which is attached to the inner wall of the clarifier, as illustrated in FIGS. 3 and 5. A pair of discharge ports 74 and 76 are provided in the wall of the conical bottom 43 to provide for taking sludge samples.

Referring to FIGS. 1–a and 1–b, it will be seen that both the sludge tank 56 and the conical bottom 43 are connected to respective pumps 79 and 81 which are connected to a conduit communicating with an entrance port 82 in the end wall 29 of the aeration tank 10. This conduit constitutes the return sludge line and carries the activated sludge for re-seeding of the aeration tank 10, as will be presently explained.

In operation, influent for the aeration tank 10 is drawn off the effluent conduit 31 and pumped by means of a positive displacement pump 33 through the distribution manifold 16, 17 thereof into the respective modules 11 of the aeration tank 10. Activated sludge from the clarifier 41 is introduced into the first module 18 of the aeration tank, as at 82. This sludge provides the seed bacteria for inoculating the raw sewage which enters the aeration tank through the branch lines 16, each branch line being provided with a valve 30 so that the quantity of sewage passing into each module of the tank 10 may be independently regulated, as desired.

As the sludge flows through the tank 10 it is aerated and thoroughly mixed with the injected raw sewage influent. The tank 10 is maintained at operating pressures ranging from 5 to 60 p.s.i.g. and, as a result, a high level of dissolved oxygen in the liquid is achieved.

Within the optimized environment of the pressurized aeration tank 10, micro organisms quickly feed upon the colloidal sewage particles and then form into colonies of floc that can settle out or be floated out in the clarifier 41.

A desired liquid level in the aeration tank 10 is maintained by regulation of the outflow through the means of the positive displacement pump 39 which is pre-set to deliver a prescribed flow. Fine adjustments may be made by the liquid level controller 84a which regulates outlet valve 85.

Treated liquor from the aeration tank 10 is pumped into the clarifier 41 and, while only one of such units of apparatus is illustrated, it will be understood that two or more of such units may be arranged in parallel so that treated liquor may be introduced into each of such units simultaneously. Each clarifier 41 is maintained substantially at the same pressure as the aeration tank 10 and this provides for retention of high levels of dissolved oxygen in the liquid.

Referring to FIGS. 3–5, the treated liquor enters the clarifier 41 through the diffuser head 69 which discharges the liquor in the clarifier in tangential relation thereto. The diffuser head 69 is capable of being rotated about an axis coincident with the axes of the conduits 71 and 73 so that it may be positioned to face in an upwardly or downwardly direction. When the clarifier 41 is operated at the same pressure as the aeration tank 10, the diffuser head 69 is directed downwardly to assist the settlement of sludge in the cone 43. If the clarifier is operated at a reduced pressure, lower than that of the aeration tank 10, the head 69 is preferably positioned so that the face thereof is directed upwardly and, in such position, the sludge tends to flow upwardly to the top of the liquid level in the clarifier.

In the clarifier 41, the activated sludge flocculates and tends to separate from the treated liquor. Accordingly, when the clarifier 41 is operated at a pressure below that of the aeration tank 10 dissolved gasses will come out of solution and buoy the sludge flocculate to the top of the liquid in the clarifier. The rotating skimmer blades 51 will engage the sludge froth on the surface of the liquid and direct the same into the cone 52 where it will fall by gravity to the bottom thereof, and through the conduit 54 into the sludge receiving tank 56 from which it is pumped through conduit 80 into the aeration tank 10 for the purpose of seeding said tank. When the clarifier 41 is operated at the same pressure as the aeration tank and the diffuser head 69 is directed downwardly, the flocculate will collect in the conical bottom 43 of the clarifier and will be pumped therefrom by a pump 81 into the return sludge line 82 which connects with the aeration tank for re-seeding purposes.

The treated liquor within the clarifier 41 is drawn off through the peripheral draw-off ring 57 of the clarifier, the rate of outflow being controlled by a valve arrangement. The treated effluent out-flow passes into conduit 60 which drains into a funnel 67 which discharges into a drain 68.

Various changes coming within the spirit of my invention may suggest themselves to those skilled in the art; hence, I do not wish to be limited to the specific embodiments shown and described or uses mentioned, but intend the same to be merely exemplary, the scope of my invention being limited only by the appended claims.

I claim:

1. An apparatus for the activated sludge treatment of a continuous flow of secondary sewage comprising
   (a) a closed aeration tank having substantial length and adapted to contain a main body of mixed liquor,
   (b) means for conducting sewage into said tank comprising a header and a plurality of branch conduits connected to said header and communicating with said tank at longitudinally spaced points thereon,
   (c) valve means associated with each branch conduit for controlling the flow of influent therethrough into said tank, and
   (d) a plurality of aerating means spaced longitudinally within said tank for aerating the mixed liquor and maintaining pressure within said tank at higher than atmospheric pressure,
   (e) said aerating means including an air sparge disposed in close proximity to the bottom of said tank and a shaft having an agitator blade arranged above said sparge and means for driving said shaft.

2. The invention as defined in claim 1 including means for clarifying the aerated mixed liquor and effecting flocculation of sludge.

3. The invention as defined in claim 2 in which the clarifying means comprises a clarifier comprising
   (a) a closed generally cylindrical vessel having a generally conical bottom and adapted to hold a liquid body having a liquid level,
   (b) a rotatably mounted skimmer blade disposed immediately above said liquid level,
   (c) means for rotating said skimmer blade,
   (d) an inverted conical funnel disposed centrally of said vessel and having its upper edge coincident with said liquid level,
   (e) conduit means connecting the lower end of said funnel to a sludge receiving tank.
   (f) an effluent draw-off-ring disposed within said vessel below said liquid level and communicating with a discharge port in the wall of said vessel,
   (g) a diffuser head disposed below said funnel, and
   (h) means for delivering mixed liquor from the aeration tank to said diffuser head.

4. The invention as defined in claim 1 including closed means for clarifying the aerated mixed liquor at higher than atmospheric pressure and effecting flocculation of sludge.

5. The invention as defined in claim 1 in which the air sparge and agitator blade are disposed eccentrically of said tank to effect rotation of said liquor within said tank.

6. In an apparatus for the activated sludge treatment of secondary sewage:
   (a) a clarifier comprising a closed generally cylindrical vessel having a generally conical bottom and adapted to hold a liquid body having a liquid level,
   (b) a rotatably mounted skimmer blade disposed immediately above said liquid level,
   (c) means for rotating said skimmer blade,
   (d) an inverted conical funnel disposed centrally of said vessel and having its upper edge coincident with said liquid level,
   (e) conduit means connecting the lower end of said funnel to a sludge receiving tank,
   (f) an effluent draw-off-ring disposed within said vessel below said liquid level and communicating with a discharge port in the wall of said vessel, and
   (g) a diffuser head disposed below said funnel and communicating with a source of aerated mixed liquor.

7. The invention as defined in claim 6 in which the diffuser head is selectively rotable to direct the incoming treated liquid in an upwardly or downwardly direction.

8. The invention as defined in claim 6 in which the draw-off-ring includes an annular chamber having a plurality of perforations in the bottom wall thereof and a baffle plate underlying said bottom wall.

9. The invention as defined in claim 6 in which the diffuser head is arranged to introduce treated liquid into the vessel in tangential relation thereto.

10. The process of treating a continuous flow of secondary sewage which comprises:
    (a) maintaining in a tank having substantial length an enclosed body of mixed liquor including secondary sewage and activated sludge being treated,
    (b) continually supplying secondary sewage to the body of mixed liquor being treated at longitudinally spaced points,
    (c) aerating said body of mixed liquor and maintaining pressure on said body at higher than atmospheric pressure,
    (d) controlling the supply of secondary sewage at the respective spaced points so that the nutrient feed level is maintained substantially uniform throughout the mixed liquor, and (e) agitating said liquor to achieve a rotating interface of mixed liquor with the air pocket above the liquid level of the tank.

11. The invention as defined in claim 10 including the step of clarifying the mixed liquor after treatment in a closed vessel while maintaining the same at higher than atmospheric pressure so as to maintain a high level of dissolved oxygen.

12. The invention as defined in claim 11 in which the mixed liquor during treatment and clarification is maintained at substantially the same pressures.

13. The invention as defined in claim 10 in which the body of mixed liquor is maintained at pressures up to 60 p.s.i.

14. The invention as defined in claim 10 including the step of returning activated sludge from the clarifier into the aeration tank for biologically re-seeding the same.

References Cited

UNITED STATES PATENTS

| | | | |
|---|---|---|---|
| 2,604,443 | 7/1952 | Fipps | 210—525X |
| 3,133,017 | 5/1964 | Lambeth | 210—221X |
| 3,275,149 | 9/1966 | Ludwig et al. | 210—220X |
| 3,444,076 | 5/1969 | Sekikawa et al. | 210—195X |
| 3,477,581 | 11/1969 | Stearns | 210—220X |

J. L. DE CESARE, Primary Examiner

U.S. Cl. X.R.

210—219, 220, 525